(12) United States Patent
Comeau et al.

(10) Patent No.: US 8,600,329 B1
(45) Date of Patent: Dec. 3, 2013

(54) INTERFERENCE SIGNAL CANCELLER

(71) Applicants: Jonathan P. Comeau, Winchester, MA (US); Matthew A. Morton, Reading, MA (US)

(72) Inventors: Jonathan P. Comeau, Winchester, MA (US); Matthew A. Morton, Reading, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/645,024

(22) Filed: Oct. 4, 2012

(51) Int. Cl.
*H04B 1/10* (2006.01)

(52) U.S. Cl.
USPC ........... 455/296; 455/302; 455/310; 455/306; 455/242.1; 455/222; 330/279

(58) Field of Classification Search
USPC ............. 455/296, 302, 310, 306, 242.1, 222; 330/279
See application file for complete search history.

(56) References Cited

U.S. PATENT DOCUMENTS

| 6,064,265 A * | 5/2000 | Yun et al. ............... 330/279 |
| 7,418,248 B2 * | 8/2008 | Maeda et al. ............ 455/203 |
| 8,351,887 B2 * | 1/2013 | Stevenson ............ 455/234.1 |

OTHER PUBLICATIONS

Donald K. Weaver, Jr., A Third Method of Generation and Detection of Singia-Sidebend Signals, Proceedings of the IRE, Jun. 25, 1956, pp. 1703-1705.

* cited by examiner

*Primary Examiner* — Sanh Phu
(74) *Attorney, Agent, or Firm* — Daly, Crowley, Mofford & Durkee, LLP

(57) ABSTRACT

An interfering signal canceller has a passive isolation element fed by an input signal in a primary path. A first frequency converter is in an auxiliary path and is fed by an input signal for converting the input signal to an intermediate or baseband signal. A bandpass filter is tuned to the interfering signal component for passing the interfering signal component of the converted input signal and suppressing the desired signal component. A second frequency converter/phase rotator section has a phase rotator fed by a local oscillator signal and a second frequency converter fed by the phase rotator and the bandpass filter. The second frequency converter/phase rotator section convert and phase adjust the passed the interfering signal component and the suppressed desired signal component to the predetermined band of frequencies. A combiner combines signals in the primary signal path and from the second frequency converter/phase rotator section.

8 Claims, 6 Drawing Sheets

INTERFERENCE SIGNAL CANCELLER

TECHNICAL FIELD

This disclosure relates generally to interference signal canceller and more particularly to active cancellation of large signal interferers in RF and microwave receivers.

BACKGROUND

As is known in the art, there is a requirement in many applications for the active cancellation of large signal interferers in radio frequency (RF) and microwave receivers. Numerous active cancellation schemes based on feed-forward (see for example: S. Ayazian, and R. Gharpurey, "Feed-forward interference cancellation in radio receiver front-ends," IEEE Transactions on Circuits and Systems-II Express Briefs, vol. 54, no. 10, pp. 902-906, October 2007 and H. Darabi, "A blocker filtering technique for SAW-less wireless receivers," IEEE Journal of Solid State Circuits, vol. 42, no. 12, pp. 2766-2773, December 2007) or feedback (see for example T. Werth, C. Schmits, R. Wunderlich, and S Heinen, "An active feedback interference cancellation technique for blocker filtering in RF receiver front-ends," IEEE Journal of Solid-State Circuits, vol. 45, no 5, pp, 989-997, May 2010) approaches have been developed, but incorporate a low-noise amplifier (or gain amplifier) in the primary signal path as a means to achieve cancellation. The incorporation of this active component in the primary signal path limits the power handling capabilities of the active cancellation circuitry. Similarly, many approaches only provide active cancellation for continuous wave (CW) signals or modulated/encoded signals based on relatively slow (<1 Mbps) modulation/encoding schemes, and require a finite amount of time for the cancellation to synchronize with the system. The ability to have the cancellation error signal generated and utilized in the cancellation approach within the first period of the interfering signal is highly desirable, as well as the ability to cancel moderate power (>10 dBm) interferers without the use of high-linearity (and high power) LNA's in the primary path.

As is also known in the art, feed-forward active cancellation is based on the ability to generate an error signal that is identical in amplitude and 180 degrees out of phase with the interfering signal, and then combine this error signal with the interfering signal to cancel it out. An approach previously developed is shown in FIG. 1. Here, the input signal (e.g., RF/microwave frequency having both the desired signal and the interfering signal of known radio frequency) is sampled and fed to an auxiliary path. The desired signal and the interfering signal in the auxiliary path are down-converted in frequency with in-phase (I) and quadrature (Q) local oscillator signals (LOI, LOQ) and a pair of mixers, as shown; with the interfering signal being converted to a known intermediate frequency (IF) or baseband frequency. The frequency down-converted signal is then amplified (or attenuated) to achieve the correct amplitude for maximum cancellation. The signal is also sent through a bandpass or lowpass filter, which is tuned to the known IF or baseband frequency, to filter out all other signals (i.e. the desired signal) leaving only the interferer/error signal in the auxiliary path. This remaining interfering signal is then up-converted in frequency by in-phase (I) and quadrature (Q) local oscillator signals (LOI, LOQ) and a pair of mixers, as shown, back to the RF/microwave frequency of interest (i.e., the original known interfering radio frequency) and combined with the full spectrum of the signal in the primary path (i.e., the input signal) to enable cancellation of the interfering signal in the primary path. As shown in FIG. 1, the auxiliary path performs both the frequency down-conversion and up-conversion in a pseudo-weaver architecture (B. Razavi, "RF microelectronics", Upper Saddle River, Prentice Hall, 1998), to address image rejection concerns during up-conversion. Amplitude alignment and phase alignment of the interfering signal in the primary and auxiliary paths must also be addressed to achieve cancellation, either by minimizing the phase and amplitude variation in the two paths, or by compensating for the variation in the primary path or in the auxiliary path.

Although the system described above in connection with FIG. 1 has demonstrated reasonable performance in previous works noted above, its usefulness in broader applications has been limited by 3 critical factors:

1) Accurate phase alignment of signals
2) The ability to handle large interfering signals
3) The ability to provide near instantaneous protection to circuitry that appears later in the receive chain (i.e. a very brief start up time for signal alignment).

In order for active cancellation circuitry to achieve high levels of cancellation (>30 dB) the error signal being generated must be within 2 degrees of phase and 0.5 dB of amplitude to the interfering signal. Although high levels of amplitude control are possible in most monolithic technologies, high levels are phase control are less readily available. Even in monolithic silicon approaches, which provide high levels integration and minimal signal delay between components, the phase delay associated with individual building blocks create challenges for phase alignment in these feed-forward cancellation schemes. These phase and amplitude alignment challenges limit the bandwidth of operation for these feed-forward approaches, as well as the magnitude of cancellation that can be achieved.

Another challenge faced with many feed-forward cancellation approaches, is the ability to maintain operation in the linear region while addressing the interfering signal. As shown in FIG. 1, the low noise amplifier (LNA) in the primary path must stay in the linear region of operation even with the presence of the interfering signal. This requirement forces an upper limit on the input power received by the active cancellation system, and can require very high linearity (and typically high power dissipation) circuitry to be incorporated for the LNA and up-conversion mixers to maximize the dynamic range of the system.

Lastly, the approach shown in FIG. 1 requires a finite amount of start-up time, before the error signal is created and can be applied to the interferer to cancel it out. This start up time is roughly the inverse of the bandwidth of the bandpass filter used in the auxiliary path. During this finite start-up time, the interfering signal will be amplified and sent into the receiver, possibly saturating or even damaging components further down-stream in the receiver.

SUMMARY

In accordance with the present disclosure, an interfering signal canceller is provided for cancelling an interfering signal component of an input signal, having a predetermined band of frequencies, from a desired signal component of the input signal. The input signal is fed to a primary path and an auxiliary path. A passive isolation element disposed in the primary path and fed by the input signal. A first frequency converter is disposed in the auxiliary path and fed by the input signal for converting the input signal to an intermediate or baseband frequency signal. A bandpass filter is tuned to the interfering signal component of the converted input signal for passing the interfering signal component of the converted input signal and for suppressing the desired signal component of the converted input signal. A second frequency converter and phase rotator section is provided having a phase rotator fed by a local oscillator signal and a second frequency converter fed by the phase rotator and the bandpass filter. The second frequency converter and phase rotator section convert and phase adjust the passed the interfering signal component and the suppressed desired signal component to the predetermined band of frequencies. A combiner is provided combining signals passed by the input signal in the primary signal path and the second frequency converter and phase rotator.

In one embodiment, an interfering signal canceller is provided for cancelling an interfering signal component of an input signal, having a predetermined band of frequencies, from a desired signal component of the input signal. The input signal is fed to a primary path and an auxiliary path. A passive isolation element is disposed in the primary path and fed by the input signal. A first frequency converter is disposed in the auxiliary path and fed by the input signal for converting the input signal to an intermediate or baseband frequency signal. A bandpass filter is tuned to the interfering signal component of the converted input signal for passing the interfering signal component of the converted input signal and for suppressing the desired signal component of the converted input signal. A second frequency converter is provided for converting the passed the interfering signal component and the suppressed desired signal component to the predetermined band of frequencies. A combiner is provided for combining signals passed by the passive isolation element and the second frequency converter.

In one embodiment, an interfering signal canceller is provided for cancelling an interfering signal component of an input signal, having a predetermined band of frequencies, from a desired signal component of the input signal. The input signal is fed to a primary path and an auxiliary path. A first frequency converter is disposed in the auxiliary path and fed by the input signal for converting the input signal to an intermediate or baseband frequency signal. A bandpass filter is tuned to the interfering signal component of the converted input signal for passing the interfering signal component of the converted input signal and for suppressing the desired signal component of the converted input signal. A second frequency converter and phase rotator section is provided having a phase rotator fed by a local oscillator signal and a second frequency converter fed by the phase rotator and the bandpass filter. The second frequency converter and phase rotator section convert and phase adjust the passed the interfering signal component and the suppressed desired signal component to the predetermined band of frequencies. A combiner and time delay compensator is provided for combining signals in the primary path and the second frequency converter and compensating for time delays between the signals in the primary path and by the first frequency converter, variable gain amplifier, bandpass filter, and second frequency converter section.

In one embodiment, the passive isolation element is an isolator, circulator, or circuit.

With such an arrangement, the active circuit, (i.e., the LNA that was in the primary path in FIG. 1) has been replaced by a passive isolation element, such as, for example, an isolator, or circulator, or circuit, which provides isolation from the output of the feed-forward auxiliary path and the input of the feed-forward auxiliary path. This isolation prevents the feed-forward approach from becoming a feed-back signal, allowing high levels of signal cancellation and also eliminates chances of instability associated with coupling between the primary and auxiliary paths. The use of a passive circuit (which does not have gain) instead of an active circuit (which would presumably have gain) also improves the power handling capability of the active cancellation system. The implementation of this approach is able leverage 3 core technologies; highly programmable monolithic silicon technology for the auxiliary path, passive and compact delay line and a passive isolation element for the primary path, and high linearity III-V components for the up-conversion mixer (in the auxiliary path) and combiner circuitry (connecting the primary and auxiliary paths).

Further, with such an arrangement, an interference canceller is provided having means to obtain tunable, high levels of cancellation for moderate power level signals, with minimal signal leakage reaching any receiver components further down-stream of the system. The canceller includes a passive reverse isolation component (i.e., a passive isolation element), a delay line element in the primary path for a feed-forward active cancellation approach, and active phase rotators in the local oscillator (LO) path for additional phase alignment.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
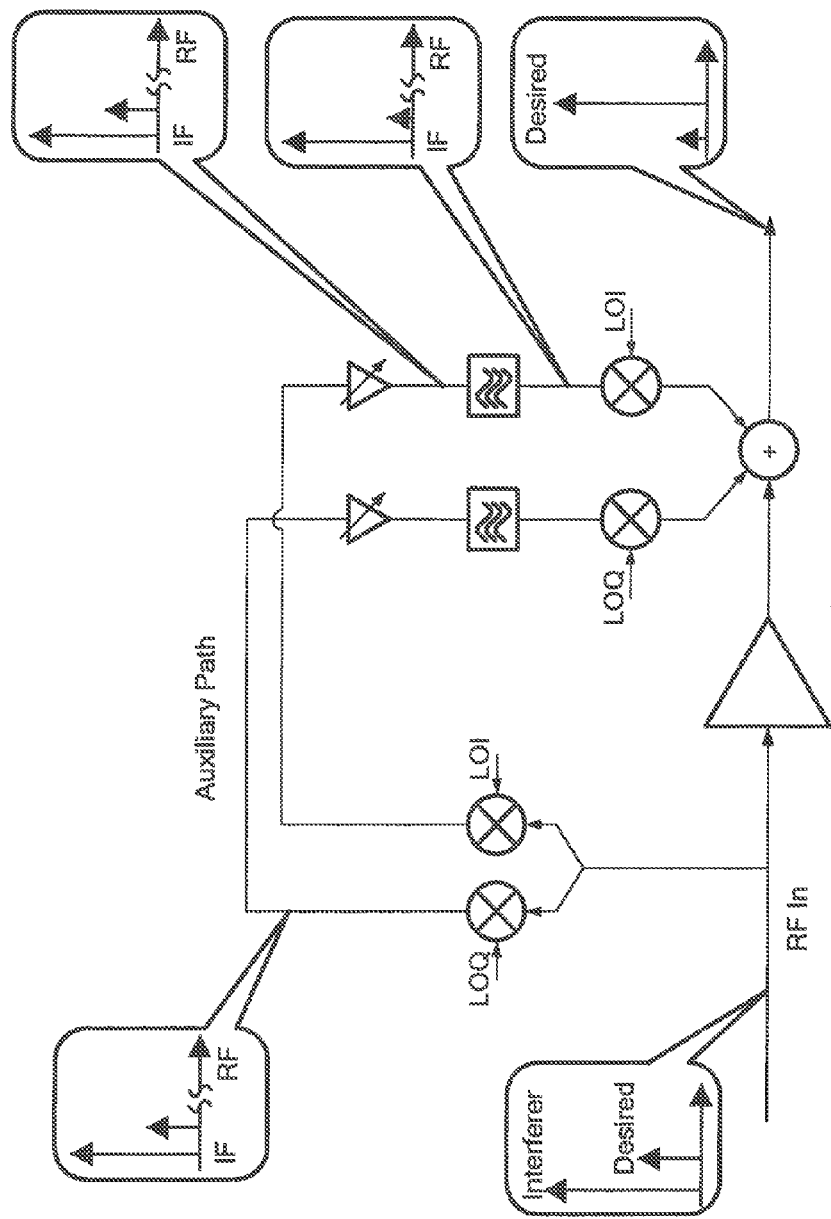
FIG. 1 is a block diagram of an interfering signal canceller according to the PRIOR ART.
Figure 2:
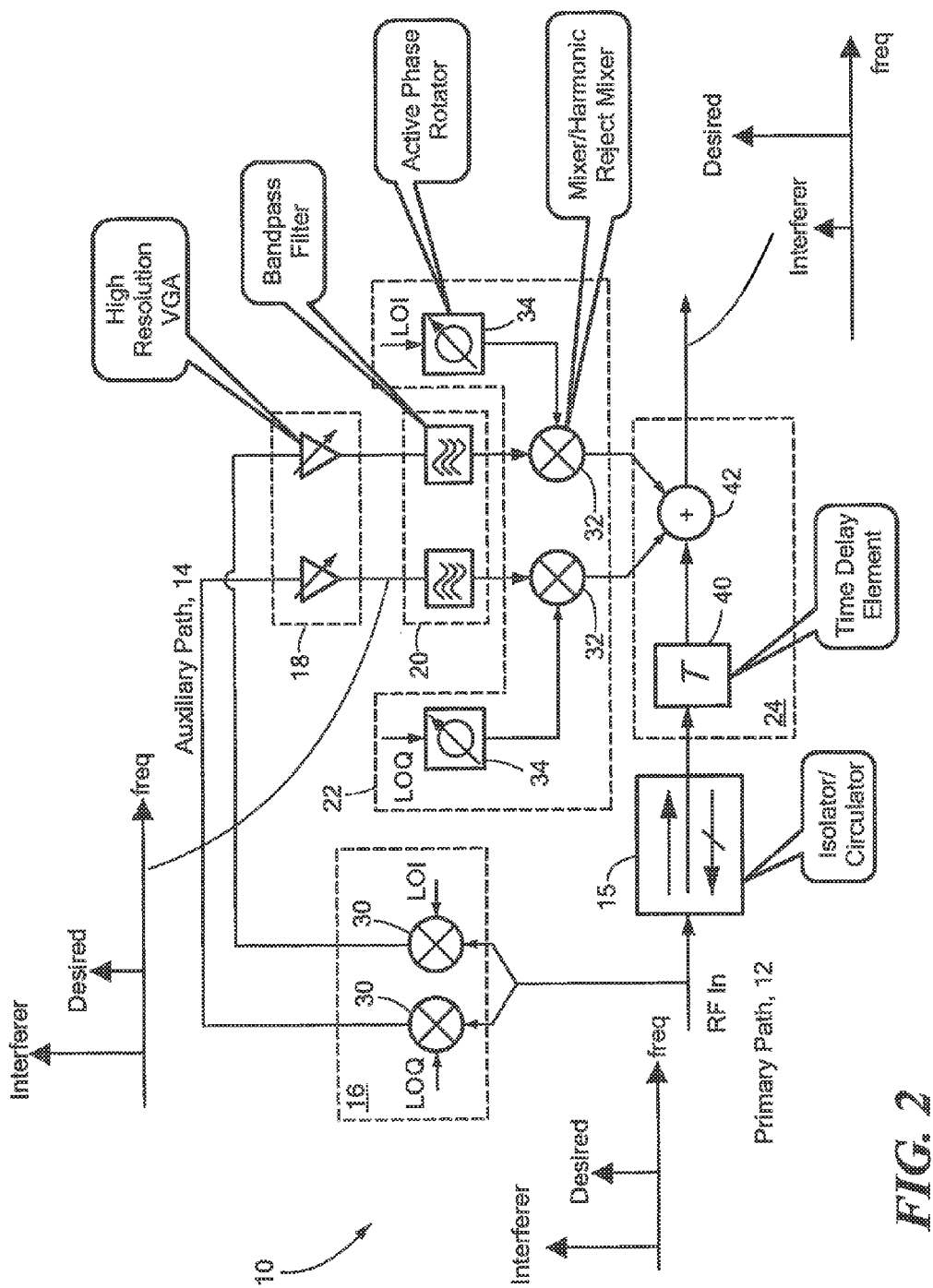
FIG. 2 is a block diagram of an interfering signal canceller according to the disclosure.

Referring now to FIG. 2, an active interfering signal canceller 10 is shown. The interfering signal canceller 10 cancels an interfering signal component of an input signal, having a predetermined band of frequencies, from a desired signal component of the input signal. The input signal is fed to a primary path 12 and an auxiliary path 14. Here the input signal is an RF pulse train. The inference canceller 10 includes; a passive isolation element 15 disposed in the primary path 12 and fed by the input signal; a first frequency converter 16 is disposed in the auxiliary path 14 and is fed by the input signal for converting the input signal to an intermediate or baseband frequency signal; an amplifier section 18 fed by the first frequency converter 16; a bandpass filter section 20 tuned to the interfering signal component of the converted input signal for passing the interfering signal component of the converted input signal and for suppressing the desired signal component of the converted input signal; a second frequency converter and phase rotator section 22 for converting and phase adjusting the passed the interfering signal component and the suppressed desired signal component to the predetermined band of frequencies; and a combiner and time delay compensation section 24 for combining signals passed by the passive isolation element 15 and the second frequency converter and phase rotator section 22 and for compensating for time delays between the signals in passed by the passive isolator 15 and by the second frequency converter and phase rotator section 22.

More particularly, the input signal having a predetermined hand of frequencies (e.g., RF/microwave frequency having both the desired signal and the interfering signal of known radio frequency), is sampled and fed to the auxiliary path 14. The desired signal and the interfering signal in the auxiliary path 14 are passed through the first frequency converter 16 where they are down-converted in frequency with in-phase (I) and quadrature (Q) local oscillator signals (LOI, LOQ) and a pair of mixers, as shown; with the interfering signal being converted to a known intermediate frequency (IF) or baseband frequency. The frequency down-converted signal is then amplified (or attenuated) in the amplifier section 18 (here variable gain amplifiers (VGAs)) to achieve the correct amplitude for maximum. cancellation. The amplified signals are then passed to the bandpass filter section 20 tuned to the interfering signal component of the converted input signal for passing the interfering signal component of the converted input signal and for suppressing the desired signal component of the converted input signal. Next, the bandpass filtered signals are fed to the second frequency converter and phase rotator section 22.

More particularly, the second frequency converter and phase rotator section 22 includes mixers 32 fed by the bandpass filtered signals and by phase rotators 34. The phase rotators 34 are fed by the in-phase and quadrature local oscillator signals LOI, LOQ, as indicated. Thus, the bandpass filtered signals are fed to the second frequency converter and phase rotator section 22 for converting and phase adjusting the passed the interfering signal component and the suppressed desired signal component to the original predetermined band of frequencies while also adjusting the phase shift of the bandpass filtered signals.

Thus, the signal is sent through a bandpass filter 20, which is tuned to the known frequency of the interfering signal, to filter out all other signals (i.e. the desired signal) leaving only the interferer/error signal in the auxiliary path is then up-converted in frequency and phase shifted by in-phase (I) and quadrature (Q) local oscillator signals (LOI, LOQ) fed to a pair of mixers 32 and the phase rotators 34 as shown, back to the RF/microwave frequency of interest (i.e., its original known radio frequency) for combing with the full spectrum of the signal in the primary path 12 (i.e., the input signal) to enable cancellation of the interfering signal in the primary path 12. The auxiliary path 14 performs both the frequency down-conversion and up-conversion in a pseudo-weaver architecture to address image rejection concerns during up-conversion.

The combiner and time delay compensation section 24 combine signals passed by the passive isolation element 15 and the second frequency converter and phase rotator section 22 and compensate for time delays between the signals in passed by the passive isolation element 15 and by the second frequency converter and phase rotator section 22. More particularly, both a time delay 40 and the passive isolator 15 are disposed in the primary path 12. More particularly, the time delay element 40, such as a delay line, is disposed between the output of the passive element 15 and a combiner 42, as shown.

The time delay 40 compensates for any time delay between the primary path 12 and the auxiliary path 14 so that an RF pulse fed to the combiner 42 through the primary path 12 and to the combiner 42 through the secondary path 14 arrive at the combiner 42 at the same time for cancellation of the interfering signal.

The canceller 10 incorporates active phase rotators 22 (or vector modulators) in the LO or auxiliary path 14. This canceller 10 enables high levels of phase accuracy of the LO signals (within 1 degree) and allows accurate phase alignment of the up-converted error signal for maximum cancellation of the interferer. The use of harmonic rejection mixers 32 are used enabling the highest level of spurious free dynamic range for the up-converted signal at the output of the auxiliary path.

As noted above, the time delay element 40 in the primary path 12 delays the signal propagating through the primary path 12, such that the signal will be aligned with the error signal that propagates through the auxiliary path 14. The amount of delay is approximately equal to the inverse of the bandwidth of the bandpass filter 20 used in the auxiliary path 14.

Figure 3:
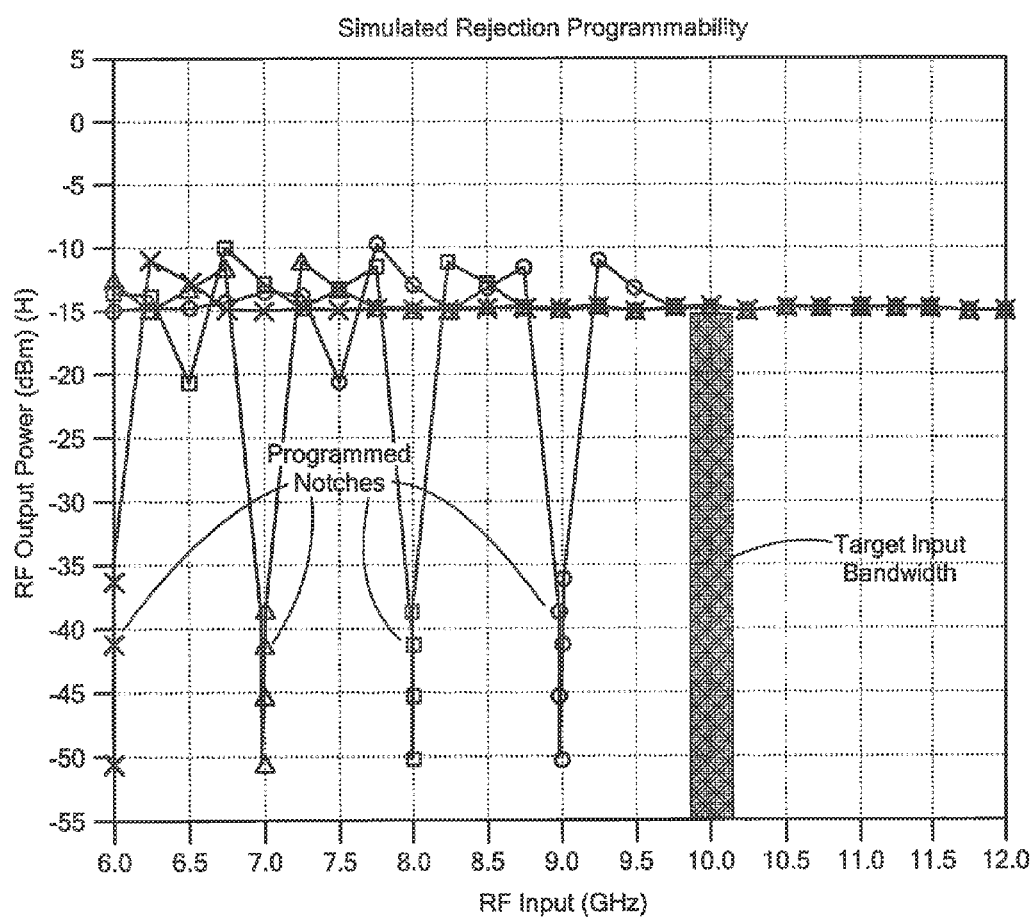
FIG. 3 shows simulated tunable cancellation for a target input signal of 10 GHz fed to the canceller of FIG. 2, the tunability of the cancellation being provided by controlling the LO frequency of an auxiliary loop, such that the interfering signal falls within the pass band of the bandpass filter in the auxiliary path.

This canceller 10 has been evaluated based on building blocks in the Advanced Design System (ADS) software design tool, with the results shown in FIGS. 3 and 4. As seen in FIG. 3, the canceller 10 achieves high levels of rejection, with the ability to tune the location of the rejection to various frequencies over a wide band of operation. More particularly, FIG. 3, shows simulated tunable cancellation for a target input signal of 10 GHz fed to the canceller of FIG. 2, the tunability of the cancellation being provided by controlling the LO frequency of an auxiliary loop, such that the interfering signal falls within the pass band of the bandpass filter in the auxiliary path.

Figure 4A:
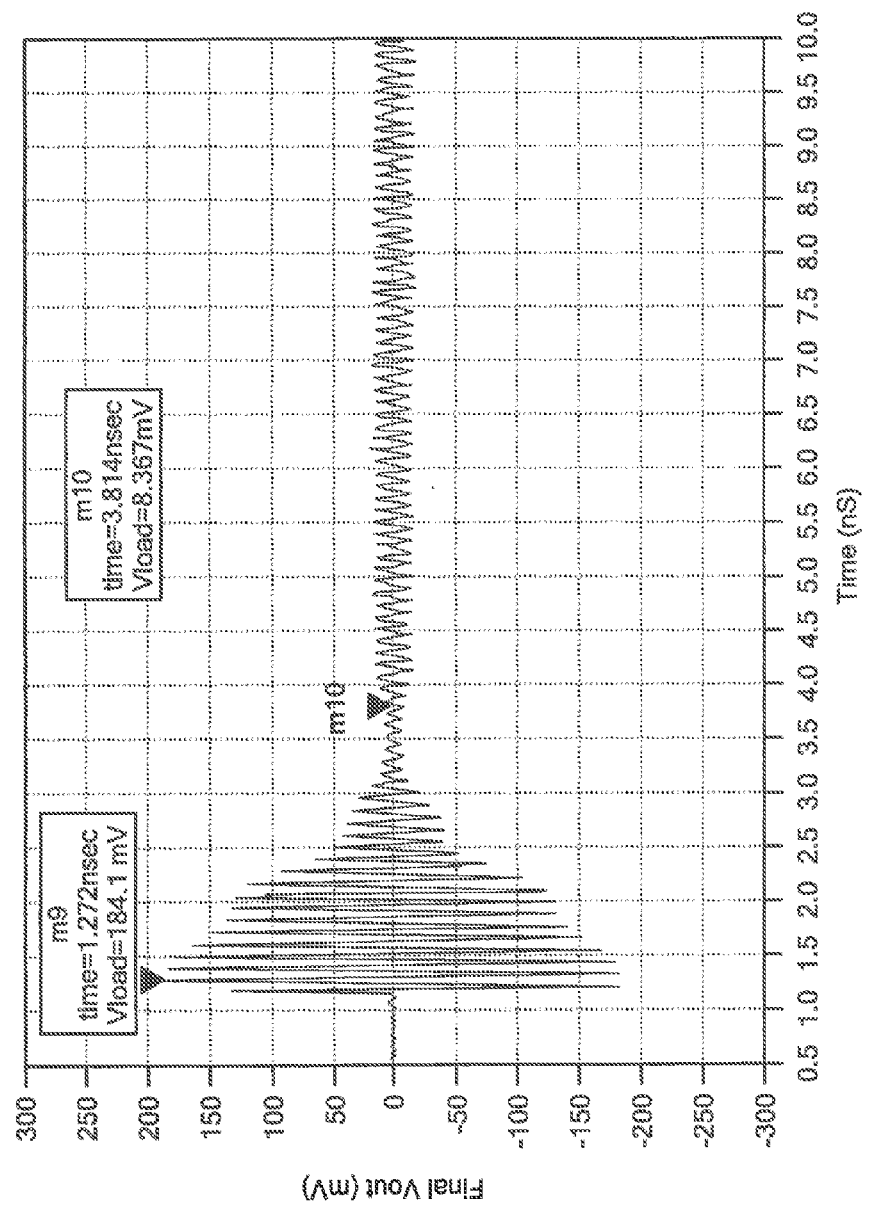
FIG. 4A show simulated transient output voltage response of the canceller without the additional time delay element in a primary path of the canceller of FIG. 2
Figure 4B:
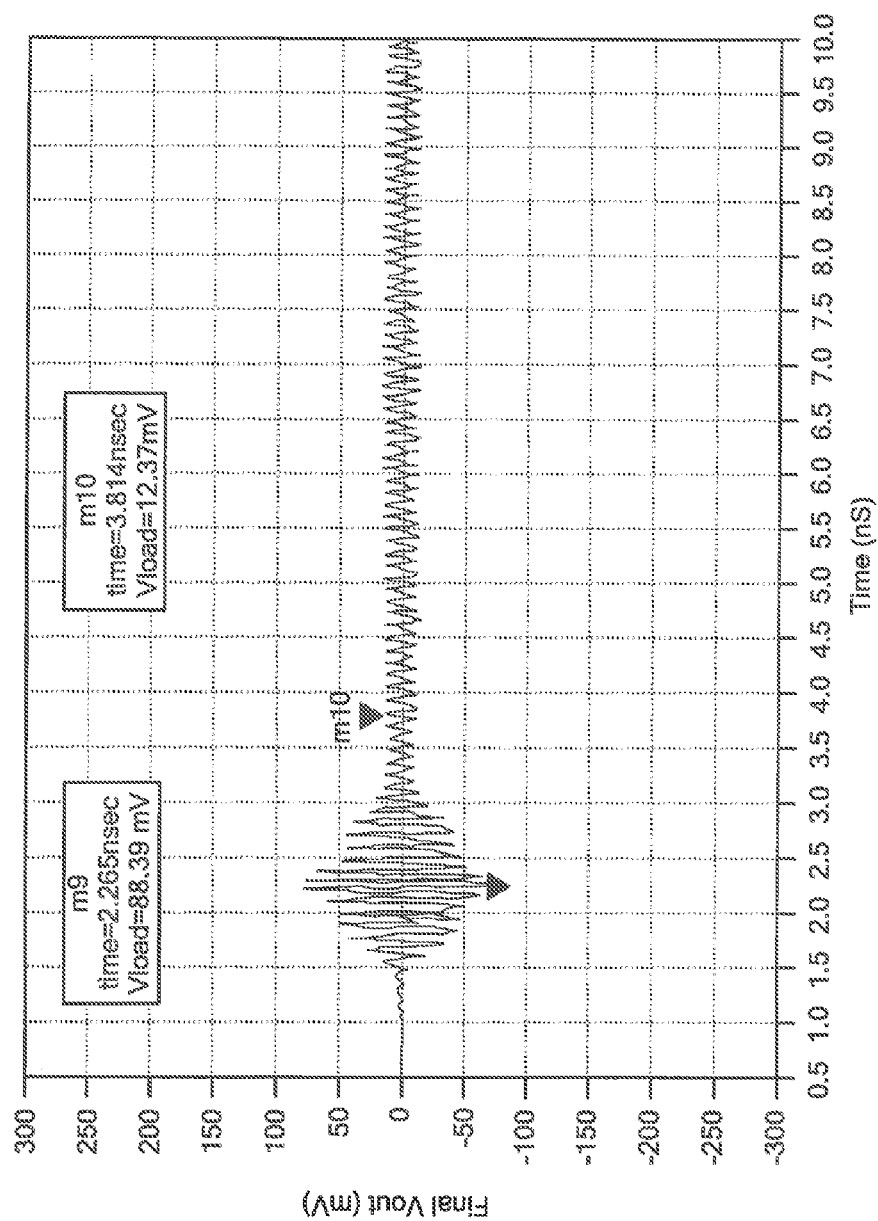
FIG. 4B shows simulated transient output voltage response of system with the additional time delay element in the primary path.

FIGS. 4A and 4B demonstrate the response time of the system, and the ability to have near instantaneous cancellation. FIG. 4A show the response of the system with the active cancellation without the additional time delay element in the primary signal path to a stepped pulse of RF input power. As can be seen from FIG. 4A, there is substantial delay around the auxiliary path, resulting in moderate voltage swings at the output of the system, due to the undesirable leakage of the interferer signal in the first few nanoseconds. This undesired leakage signal can saturate portions of the receiver, resulting in long recovery times. To address this issue, the time delay element has been included in the primary path, with the resulting transient response in FIG. 4B, resulting in a substantially reduced leakage signal (i.e. near instantaneous cancellation). More particularly, FIG. 4A show simulated transient response of network without the additional time delay element in primary path and FIG. 4B shows simulated transient response of system with the additional time delay element in the primary path.

Figure 5:
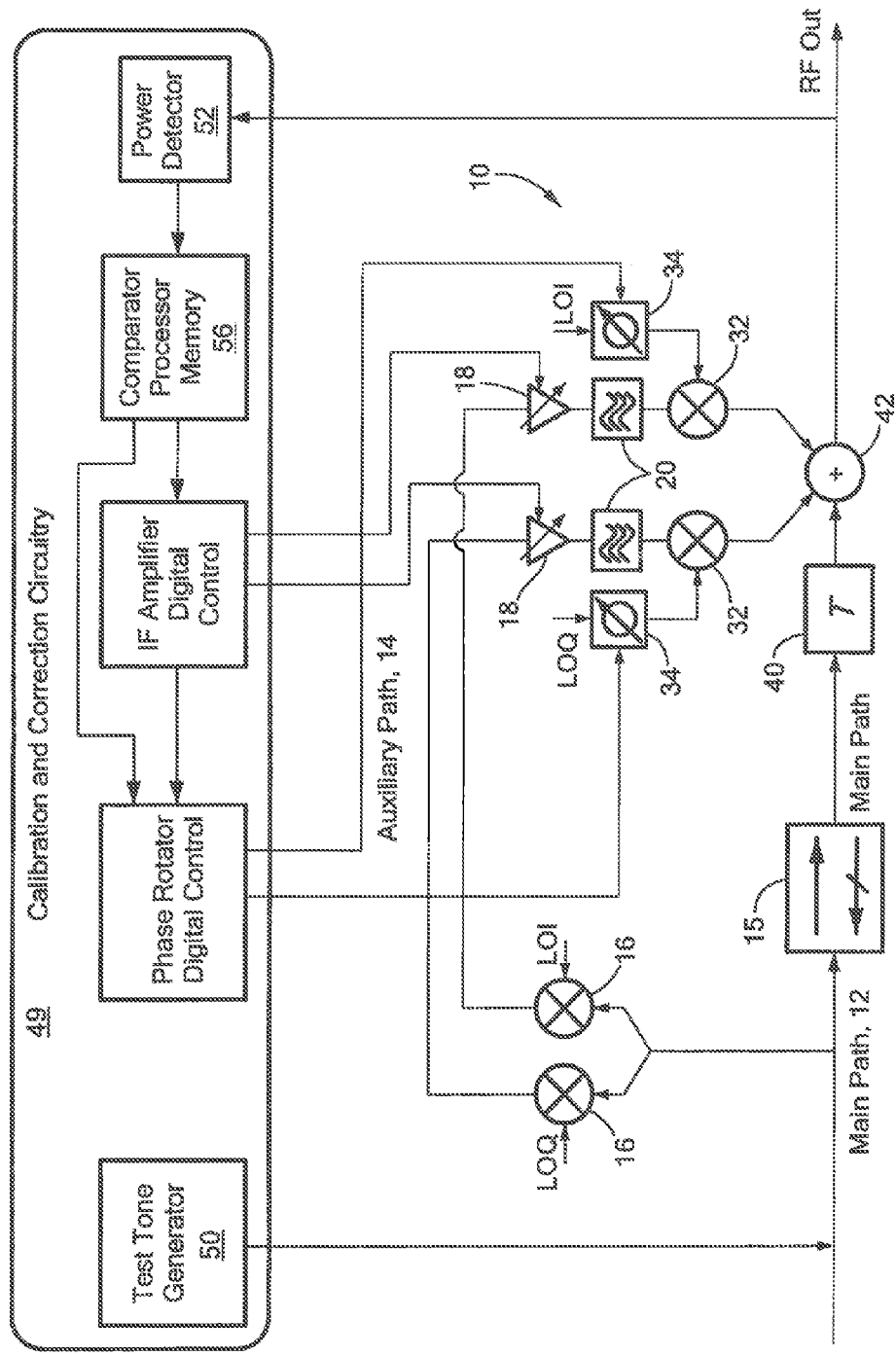
FIG. 5 is a block diagram of a calibration of cancellation system for the interfering signal canceller of FIG. 2.

As with any cancellation system, accurate control of the phase amplitude is critical for sufficient cancellation. Therefore a calibration network 49 for canceller 10 is shown in FIG. 5, uses a test tone generator 50 to create an artificial interference signal (or test signal) which will be injected into the input of the canceller 10, as shown. The output of the canceller 10 is monitored by a power detector 52. This power detector 52 indicates the magnitude of cancellation achieved by the canceller 10. Either by intelligent searching or simple parameter sweep, the optimal amplitude and phase correction is determined for the various interference input frequencies, as well as for supply and temperature variation. These optimal states are stored in memory 56, and then recalled and loaded to achieve maximum cancellation for the system for a variety of electrical (i.e. supply voltage and interference signal frequency) and environmental (i.e. temperature) scenarios to establish proper control signals for the amplifiers 18 and phase rotators 34.

Thus, the combination of passive reverse isolation element, with analog phase and amplitude control circuitry, and an additional time delay element has substantially improved the magnitude of cancellation that can be achieved, the magnitude of interferers that can be addressed, and the magnitude of signal leakage that will occur during the initial response of the canceller.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. An interfering signal canceller for cancelling an interfering signal component of an input signal, having a predetermined band of frequencies, from a desired signal component of the input signal, wherein the input signal is fed to a primary path and an auxiliary path, the interfering signal canceller comprising:
    a passive isolation element disposed in the primary path and fed by the input signal;
    a first frequency converter disposed in the auxiliary path and fed by the input signal for converting the input signal to an intermediate or baseband frequency signal;
    a bandpass filter tuned to the interfering signal component of the converted input signal for passing the interfering signal component of the converted input signal and for suppressing the desired signal component of the converted input signal;
    a second frequency converter and phase rotator section for converting and phase adjusting the passed the interfering signal component and the suppressed desired signal component to the predetermined band of frequencies;
    a combiner and time delay compensator for combining signals passed by the passive isolation element and the second frequency converter and phase rotator section and compensating for time delays between the signals passed by the passive isolation element and by the second frequency converter and phase rotator section.

2. An interfering signal canceller for cancelling an interfering signal component of an input signal, having a predetermined band of frequencies, from a desired signal component of the input signal, wherein the input signal is fed to a primary path and an auxiliary path, the interfering signal canceller comprising:
    a passive isolation element disposed in the primary path and fed by the input signal;
    a first frequency converter disposed in the auxiliary path and fed by the input signal for converting the input signal to an intermediate or baseband frequency signal;
    a bandpass filter tuned to the interfering signal component of the converted input signal for passing the interfering signal component of the converted input signal and for suppressing the desired signal component of the converted input signal;
    a second frequency converter for converting the passed the interfering signal component and the suppressed desired signal component to the predetermined band of frequencies;
    a combiner for combining signals passed by the passive isolation element and the second frequency converter.

3. An interfering signal canceller for cancelling an interfering signal component of an input signal, having a predetermined band of frequencies, from a desired signal component of the input signal, wherein the input signal is fed to a primary path and an auxiliary path, the interfering signal canceller comprising:
    a first frequency converter disposed in the auxiliary path and fed by the input signal for converting the input signal to an intermediate or baseband frequency signal;
    a bandpass filter tuned to the interfering signal component of the converted input signal for passing the interfering signal component of the converted input signal and for suppressing the desired signal component of the converted input signal;
    a second frequency converter and phase rotator section for converting and phase adjusting the passed the interfering signal component and the suppressed desired signal component to the predetermined band of frequencies;
    a combiner and time delay compensator for combining signals in the primary path and the second frequency converter and phase rotator section and compensating for time delays between the signals in the primary path and by the second frequency converter and phase rotator section.

4. The canceller recited in claim 1 wherein the passive isolation element is an isolator, circulator, or circuit.

5. The canceller recited in claim 2 wherein the passive isolation element is an isolator, circulator, or circuit.

6. An interfering signal canceller for cancelling an interfering signal component of an input signal, having a predetermined band of frequencies, from a desired signal component of the input signal, wherein the input signal is fed to a primary path and an auxiliary path, the interfering signal canceller comprising:
    a first frequency converter disposed in the auxiliary path and fed by the input signal for converting the input signal to an intermediate or baseband frequency signal;
    a bandpass filter tuned to the interfering signal component of the converted input signal for passing the interfering signal component of the converted input signal and for suppressing the desired signal component of the converted input signal;
    a second frequency converter and phase rotator section, comprising:
        a phase rotator fed by a local oscillator signal; and
        a second frequency converter fed by the phase rotator and the bandpass filter;
        wherein the second frequency converter and phase rotator section converts and phase adjusts the passed the interfering signal component and the suppressed desired signal component to the predetermined band of frequencies;
    a combiner for combining signals passed by the input signal in the primary signal path and the second frequency converter and phase rotator.

7. The canceller recited in claim 1 wherein the second frequency converter and phase rotator section, comprises: a phase rotator fed by a local oscillator signal; and a second frequency converter fed by the phase rotator and the bandpass filter.

8. The canceller recited in claim 3 wherein the second frequency converter and phase rotator section, comprises: a phase rotator fed by a local oscillator signal; and a second frequency converter fed by the phase rotator and the bandpass filter.

* * * * *